United States Patent
Nishino et al.

(10) Patent No.: US 10,048,552 B2
(45) Date of Patent: Aug. 14, 2018

(54) DISPLAY DEVICE

(71) Applicant: Japan Display Inc., Tokyo (JP)

(72) Inventors: Tomonori Nishino, Tokyo (JP); Syou Yanagisawa, Tokyo (JP); Kentaro Agata, Tokyo (JP); Hiroyuki Abe, Tokyo (JP); Takayuki Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 72 days.

(21) Appl. No.: 15/234,113

(22) Filed: Aug. 11, 2016

(65) Prior Publication Data

US 2016/0349581 A1    Dec. 1, 2016

Related U.S. Application Data

(63) Continuation of application No. 14/478,199, filed on Sep. 5, 2014, now Pat. No. 9,442,336.

(30) Foreign Application Priority Data

Sep. 5, 2013    (JP) ................................. 2013-183795

(51) Int. Cl.
*G02F 1/1345*    (2006.01)
*G02F 1/1362*    (2006.01)
*G02F 1/1333*    (2006.01)

(52) U.S. Cl.
CPC .... *G02F 1/136204* (2013.01); *G02F 1/13458* (2013.01); *G02F 1/133351* (2013.01)

(58) Field of Classification Search
None
See application file for complete search history.

(56) References Cited

U.S. PATENT DOCUMENTS

| | | | |
|---|---|---|---|
| 5,652,632 A | | 7/1997 | Shimizu |
| 5,684,546 A | * | 11/1997 | Kim ..................... G02F 1/1345 349/139 |

(Continued)

FOREIGN PATENT DOCUMENTS

| | | |
|---|---|---|
| JP | H08-101397 A | 4/1996 |
| JP | H11-84353 A | 3/1999 |
| JP | 2001-324721 A | 11/2001 |

OTHER PUBLICATIONS

Chinese Office Action dated Oct. 8, 2016 for corresponding Chinese Application No. 201410444565.9.

*Primary Examiner* — Ryan Crockett
(74) *Attorney, Agent, or Firm* — Typha IP LLC

(57) ABSTRACT

This invention envisages flexible wiring substrate terminals serving to connect with the wires for preventing dielectric breakdown caused by static electricity during the manufacturing process, and reducing the number of the flexible wiring substrate terminals. On a mother TFT substrate, signal lines extend over each liquid crystal cell in a manner flanking a scribe line between the adjacent liquid crystal cells. The signal lines of each liquid crystal cell are connected with connecting lines striding the scribe line. This reduces the number of static electricity countermeasure wires extending from the flexible wiring substrate terminals of each liquid crystal cell. Once completed, the individual liquid crystal cells are separated from one another, with no adverse effects caused by the connecting lines.

9 Claims, 5 Drawing Sheets

(56) References Cited

U.S. PATENT DOCUMENTS

| | | | |
|---|---|---|---|
| 6,271,600 B1* | 8/2001 | Inada | G02F 1/1345 257/59 |
| 7,787,096 B2* | 8/2010 | Ohgiichi | G02F 1/1345 349/151 |
| 2005/0162581 A1* | 7/2005 | Lim | G02F 1/1345 349/54 |
| 2006/0067143 A1* | 3/2006 | Kim | G02F 1/1362 365/201 |
| 2008/0174713 A1* | 7/2008 | Cheng | G02F 1/136259 349/54 |
| 2010/0060815 A1* | 3/2010 | Yamada | G02F 1/1345 349/39 |
| 2014/0029228 A1* | 1/2014 | Yamaguchi | H05K 7/02 361/784 |

* cited by examiner

-Prior Art-

-Prior Art-

-Prior Art-

-Prior Art-

DISPLAY DEVICE

CROSS-REFERENCE TO RELATED APPLICATION

This application is a continuation of U.S. application Ser. No. 14/478,199, filed on Sep. 5, 2014. Further, this application claims priority from Japanese Patent Application JP 2013-183795 filed on Sep. 5, 2013, the entire contents of which are hereby incorporated by reference into this application.

BACKGROUND OF THE INVENTION

1. Field of the Invention

The present invention relates to a display device. More particularly, the invention relates to a liquid crystal display device in whose manufacturing process the destruction of wiring and other parts by static electricity is effectively prevented.

2. Description of the Related Art

In the liquid crystal display device, a TFT substrate having pixel electrodes and thin film transistors (TFTs) formed in a matrix thereon is opposed to a counter substrate having color filters or overcoat films formed at the locations corresponding to the pixel electrodes of the TFT substrate, the TFT substrate and the counter substrate sandwiching a liquid crystal therebetween. The light transmission rate of liquid crystal molecules is controlled per pixel to form images.

Because it is not efficient to manufacture individual liquid crystal display panels making up the liquid crystal display device, numerous liquid crystal cells are formed on a mother substrate that is later divided into individual liquid crystal cells. In particular, the TFT substrate has numerous TFTs, video signal lines, and scanning signal lines formed with a short spacing therebetween. Static electricity, if incurred during the manufacturing process, can lead to dielectric breakdown between wires or breakdown of TFTs. To prevent such eventualities, the signal lines are connected to a common line so that static electricity will not occur between wires during the manufacturing process. On the mother substrate, the common line is connected to ground wires formed between the individual liquid crystal display panels.

JP-1999-84353-A describes a structure in which numerous liquid crystal display panels are formed on the mother substrate, the liquid crystal display panels being subjected to lighting inspection. The signal lines of the individual liquid crystal display panels are made common to each column for a single inspection. In this structure, the liquid crystal display panels arrayed in each row on the mother substrate are subjected to a single lighting inspection.

SUMMARY OF THE INVENTION

FIG. 7 is a schematic plan view of a mother TFT board 1000. In FIG. 7, liquid crystal cells 10 are formed in a matrix. Each liquid crystal cell 10 has a display area 11 and a terminal area 12. Between the upper liquid crystal cell 10 and the lower liquid crystal cell 10 is a static electricity countermeasure element 21. A static electricity countermeasure wire 20 connects the static electricity countermeasure element 21 with the terminal area 12 of the liquid crystal cell 10. The individual static electricity countermeasure elements 21 are connected to a static electricity countermeasure common line 22.

FIG. 8 is a plan view showing a partial overall structure of a TFT substrate associated only with the liquid crystal cells indicated in FIG. 7. In FIG. 8, a gate circuit 30 is built in on the right of the display area 11. Although an IC driver has yet to be mounted on the TFT substrate in its state shown in FIG. 8, the area delineated with dotted lines in the terminal area constitutes an IC drive mounting area 40. The terminal area 12 is provided with a flexible wiring substrate terminal 70 to be connected to a flexible wiring substrate.

FIG. 9 is an enlarged plan view of the vicinity of the flexible wiring substrate terminal 70 shown in FIG. 8. In FIG. 9, signal lines extending from the display area are connected to the flexible wiring substrate terminals 70 formed near a scribe line 90 constituting a product contour. A ground wire 51 provided outside the signal lines 50 is also connected to the flexible wiring substrate terminals 70.

In FIG. 9, the static electricity countermeasure wires 20 extend from the flexible wiring substrate terminals 70 beyond the scribe lines 90 making up the product contour. The static electricity countermeasure wires 20 are connected to the static electricity countermeasure elements 21 in a portion not shown in FIG. 9. A line output from the static electricity countermeasure elements 21 is connected to the static electricity countermeasure common line 22 as shown in FIG. 7.

FIG. 10 shows a cross-section taken along line A-A in FIG. 9. This is a cross-sectional view showing the signal line 50, flexible wiring substrate terminal 70, and static electricity countermeasure wire 20 near the scribe line 90 constituting the product contour. In FIG. 10, a first insulating film 101 is formed over a glass substrate 100, and connecting wires 60 are formed over the first insulating film 101. In this case, the connecting wires 60 make up a semiconductor layer. A second insulating film 102 is formed in a manner covering the connecting wires 60. Over the second insulating film 102, the signal lines 50 or static electricity countermeasure wires 20 are formed.

Through holes 105 are formed in the second insulating film 102. The through holes 105 connect the signal lines 50 or static electricity countermeasure wires 20 to the connecting wires 60 typically formed with a semiconductor, so that the signal lines 50 and static electricity countermeasure wires 20 are interconnected. A third insulating film 103 is formed in a manner covering the signal lines 50 or static electricity countermeasure wires 20. Terminal through holes 106 are formed in the third insulating film 103. ITOs 110 are provided in these parts to form the flexible wiring substrate terminals 70.

The left-hand side of the scribe line 90 indicated with a dotted line in FIG. 10, i.e., the side where the signal lines 50 exist, is the side that will be left as the product. The right-hand side of the scribe line 90, i.e., the side where the static electricity countermeasure wires 20 exit, is the side to be cut off from the liquid crystal cells and discarded when the liquid crystal cells are separated from the mother substrate.

As shown in FIGS. 9 and 10, the static electricity countermeasure wires 20 are connected to the signal lines 50 via the flexible wiring substrate terminals 70. This structure is not mandatory for the static electricity countermeasures. However, if there is provided a structure in which the static electricity countermeasure wires 20 are connected to the signal lines 50 via the flexible wiring substrate terminals 70 in some regions and not connected via the flexible wiring substrate terminals 70 in other regions, the reliability of the eventual products varies depending on where they were located. For this reason, the static electricity countermeasure wires 20 are connected to the signal lines 50 uniformly via the flexible wiring substrate terminals 70 in most cases.

Meanwhile, the liquid crystal display device is required to offer a high-definition screen while maintaining the same external size. On the high-definition screen, there exist a growing number of signal lines 50, which entails an increasing number of flexible wiring substrate terminals 70 connecting with the signal lines 50. Hence the growing number of wires that require static electricity countermeasures resulting in the increasing number of flexible wiring substrate terminals 70. All this adds up to the difficulty in securing a necessary area in the liquid crystal cells in which the flexible wiring substrate terminals 70 are to be installed.

It is therefore an object of the present invention to make it possible to take static electricity countermeasures by way of flexible wiring substrate terminals during the production process even if there are numerous signal lines in liquid crystal cells so that liquid crystal display devices may be produced with constant reliability.

To achieve the above and other objects of the present invention, there are provided specific means as follows:

(1) A display device including a first side having a terminal area, a second side opposed to the terminal area, a third side located on the left of the first side and connecting the first side with the second side, and a fourth side located on the right of the first side and connecting the first side with the second side. A first wire extends in exposed fashion from a flexible wiring substrate terminal formed in the terminal area up to a flank of the first side. A second wire extends in exposed fashion from the flexible wiring substrate terminal up to a flank of the third side. A third wire extends in exposed fashion from the flexible wiring substrate terminal up to a flank of the fourth side. The first, the second, and the third wires are covered either with an insulating film or with wiring except over the flanks.

(2) Preferably in the display device described in above item (1), there may exist a plurality of the second wires, part of the second wires being connected to the flexible wiring substrate terminals, the remaining second wires not being connected to the flexible wiring substrate terminals. There may also exist a plurality of the third wires, part of the third wires being connected to the flexible wiring substrate terminals, the remaining third wires not being connected to the flexible wiring substrate terminals.

(3) Preferably in the display device described in above item (2), the second and the third wires may be formed with a semiconductor layer each.

(4) Preferably in the display device described in above item (2), the part of the second wires may occupy half the number of the second wires.

(5) Preferably in the display device described in above item (2), the part of the third wires may occupy half the number of the third wires.

According to the present invention, there is provided a structure in which static electricity countermeasure wires are connected via flexible wiring substrate terminals to static electricity countermeasure elements formed outside liquid crystal cells. In this structure, the static electricity countermeasure wires of the adjacent liquid crystal cells on a mother TFT board are made common. This makes it possible to reduce the number of flexible wiring substrate terminals even as the number of signal lines increases in conjunction with the ever-higher resolution of the screen. That in turn can suppress the growing size of the liquid crystal cells resulting from the increasing number of the terminals.

Also, with the terminal count reduced, it is possible to prevent the flexible wiring substrate from growing in size.

Furthermore, because the static electricity countermeasure wires can be connected to the static electricity countermeasure elements outside the liquid crystal cells under the same conditions, the liquid crystal cells having stable reliability can be manufactured.

BRIEF DESCRIPTION OF THE DRAWINGS

Further objects and advantages of the present invention will become apparent upon a reading of the following description and appended drawings in which.

DESCRIPTION OF THE PREFERRED EMBODIMENTS

The present invention will now be described in detail through the use of some embodiments.

First Embodiment

Figure 1:
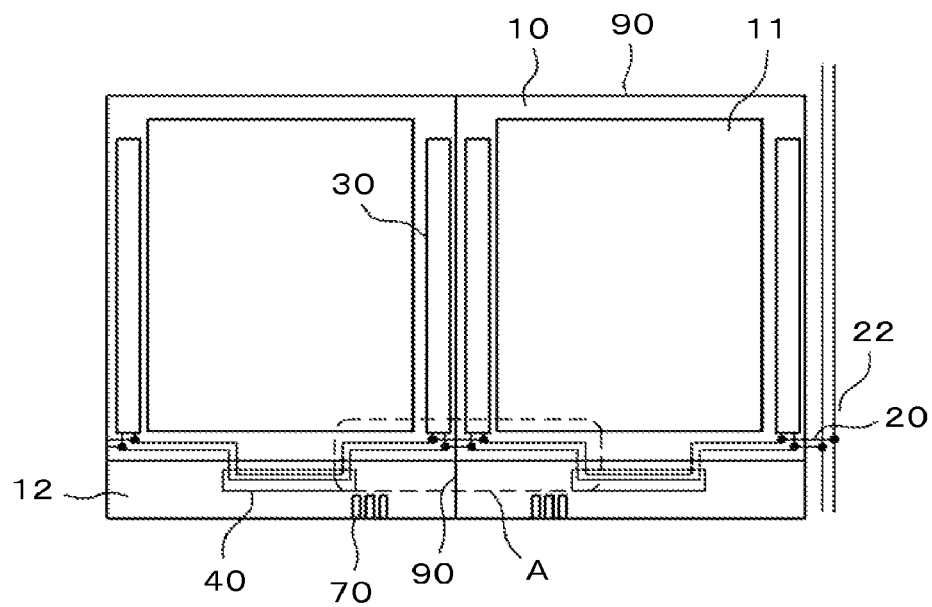
FIG. 1 is a plan view showing a partial structure of a mother TFT substrate according to the present invention.

FIG. 1 is a plan view showing two TFT substrates according to the present invention, the substrates being located on a mother TFT substrate. On the TFT substrate shown in FIG. 1, built-in gate circuits 30 are formed on both sides of a display area 11. In FIG. 1, an IC driver amounting area 40 is formed in a terminal area 12. Some of the wires from the gate circuits 30 extend to the IC driver mounting area 40. Flexible wiring substrate terminals 70 are formed at the edge of the terminal area 12. In an ordinary setup, static electricity countermeasure wires 20 extend from the flexible wiring substrate terminals 70 to the outside.

In FIG. 1, the gate circuits 30 of the adjacent liquid crystal display panels are formed in a manner flanking a scribe line 60 that separates the liquid crystal cells from one another. To prevent dielectric breakdown caused by static electricity during the manufacturing process, the wires from the gate circuits 30 need to be connected via the static electricity countermeasure wires 20 to static electricity countermeasure elements, not shown, outside the liquid crystal cells.

In FIG. 1, the wires extended from the adjacent gate circuits 30 are connected in a manner striding the scribe line 90. A static electricity countermeasure wire from either of two liquid crystal cells is extended to the outside of the cells. The static electricity countermeasure wires 20 are allowed to extend outside the liquid crystal cells and not by way of the flexible wiring substrate terminals 70. This structure reduces the number of static electricity countermeasure wires 20 extending from the liquid crystal cells.

Also, because the static electricity countermeasure wires 20 extend outside the liquid crystal cells via the flexible wiring substrate terminals 70, the number of flexible wiring substrate terminals 70 can be reduced. Since the widths of the terminals are greater than the wire widths, reducing the number of the terminals makes it possible to reduce correspondingly the size of the liquid crystal cells, and also to reduce the size of the flexible wiring substrates. In this specification, the term "signal lines" refers to gate wires, video signal lines, common lines, or ground wires.

Figure 2:
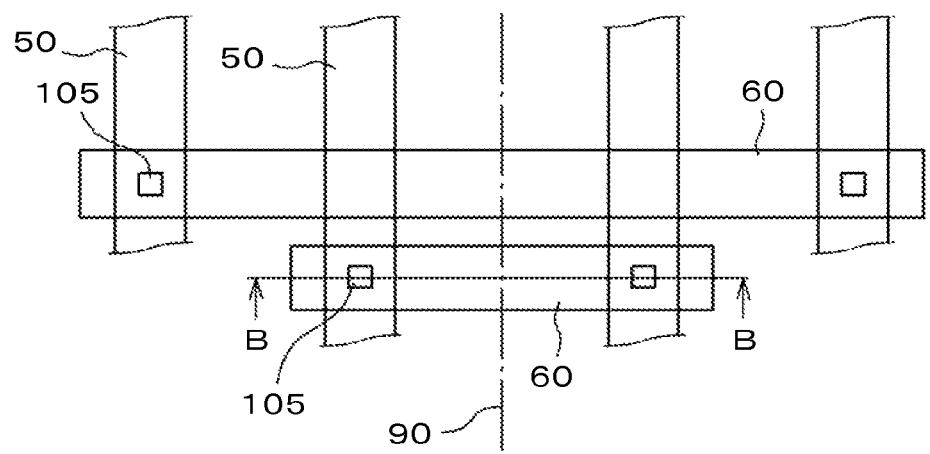
FIG. 2 is a plan view showing a connecting wire striding a scribe line.

FIG. 2 is a plan view showing how adjacent signal lines are connected in a manner flanking the scribe line 90.

In FIG. 2, over two liquid crystal cells flanking the scribe line 90, signal lines 50 extend from the gate circuits located above in the drawing but not shown. The signal lines 50 formed over the adjacent liquid crystal cells are connected with connecting wires 60. The signal lines 50 and the connecting wires 60 are formed with separate layers with an insulating film interposed therebetween; these wires are interconnected via through holes 105.

Figure 3:
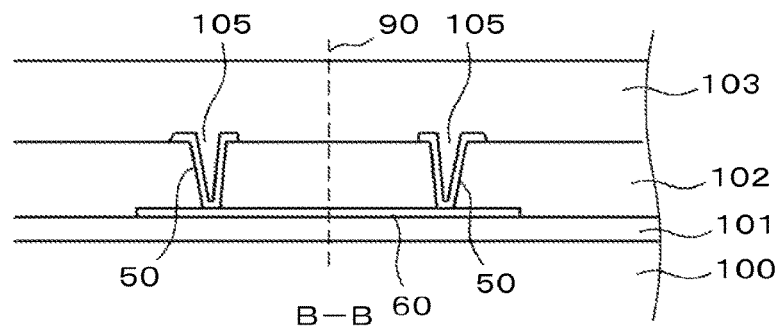
FIG. 3 is a cross-sectional view taken along line B-B in FIG. 2.

FIG. 3 is a cross-sectional view taken along line B-B in FIG. 2. In FIG. 3, a first insulating film 101 is formed over a glass substrate 100. The connecting wires 60 are formed over the first insulating film 101. The connecting wires 60 in this case are formed with a semiconductor layer. The semiconductor layer has very large resistance but offers sufficient conductivity in terms of static electricity prevention. The semiconductor layer is chemically stable and, for this reason, is used as the connecting wires 60 that will be cut off along the scribe line 90 and exposed to the atmosphere at the flanks of the liquid crystal cells. If the stability at the flanks of the liquid crystal cells is ensured, the connecting wires 60 may be formed with a metal or an alloy.

A second insulating film 102 is formed over the connecting wires 60 formed with a semiconductor layer. The signal lines 50 extend over the second insulating film 102. FIG. 3 illustrates a cross-section of the through holes 105 formed at spots where the signal lines 50 are located. The through holes 105 formed in the second insulating film 102 are covered with signal lines formed with a metal or an alloy and conduct electricity to the connecting wires 60. The signal lines 50 and through holes 105 are covered with a third insulating film 103 for protection against the atmosphere.

Figure 4:
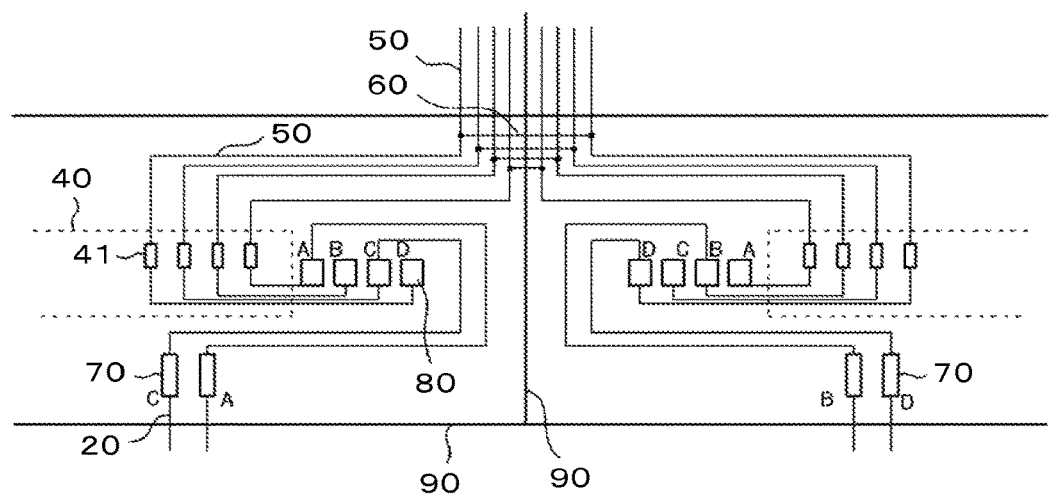
FIG. 4 is a plan view showing a first embodiment of the invention.

FIG. 4 illustrates examples of the signal lines 50, connecting wires 60, flexible wiring substrate terminals 70, and static electricity countermeasure wires 20 making up the first embodiment. The terminals and wires of the adjacent liquid crystal cells are approximately arranged in axially symmetrical fashion across the scribe line 90. Thus the liquid crystal cell on the left will be explained as a representative example. The signal lines 50 extended from the gate circuit, not shown, are connected to inspection terminals 80 via IC driver terminals 41 formed in the IC driver mounting area 40. The wires extending from the inspection terminals 80 are connected to the flexible wiring substrate terminals 70. Furthermore, the static electricity countermeasure wires 20 extend from the flexible wiring substrate terminals 70.

In FIG. 4, there exist four wires in the left-hand liquid crystal cell while there are two flexible wiring substrate terminals 70 and two static electricity countermeasure wires 20. Also in FIG. 4, there exist four signal lines 50 in the right-hand liquid crystal cell, while there are two flexible wiring substrate terminals 70 and two static electricity countermeasure wires 20. The reason the number of flexible wiring substrate terminals 70 and that of static electricity countermeasure wires 20 can be reduced in this manner is that the connecting wires 60 striding the scribe line 90 connect with the signal lines 50 that are arranged in axial symmetrical fashion across the scribe line 90.

In FIG. 4, the wires corresponding to the inspection terminals A and C are connected to the flexible wiring substrate terminals 70 in the left-hand liquid crystal cell, and the wires corresponding to the inspection terminals B and D are connected to the flexible wiring substrate terminals 70 in the right-hand liquid crystal cell. That is, in each liquid crystal cell, there are half as many flexible wiring substrate terminals 70 as the inspection terminals 50. The static electricity countermeasure wires 20 extending from the flexible wiring substrate terminals 70 beyond the scribe line 90 are connected via static electricity countermeasure elements, not shown, to a static electricity countermeasure common line, not shown, outside the liquid crystal cells.

According to the first embodiment, there may be only half as many flexible wiring substrate terminals 70 connected to the static electricity countermeasure wires 20 as the signal lines 50 that need to be protected against static electricity. Furthermore, the flexible wiring substrate terminals 70 in the adjacent liquid crystal cells can be arranged in axially symmetrical fashion across the scribe line 90. This makes it possible to arrange each liquid crystal cells and each flexible wiring substrate in such a manner that their centers can approximately coincide with one another.

Second Embodiment

Figure 5:
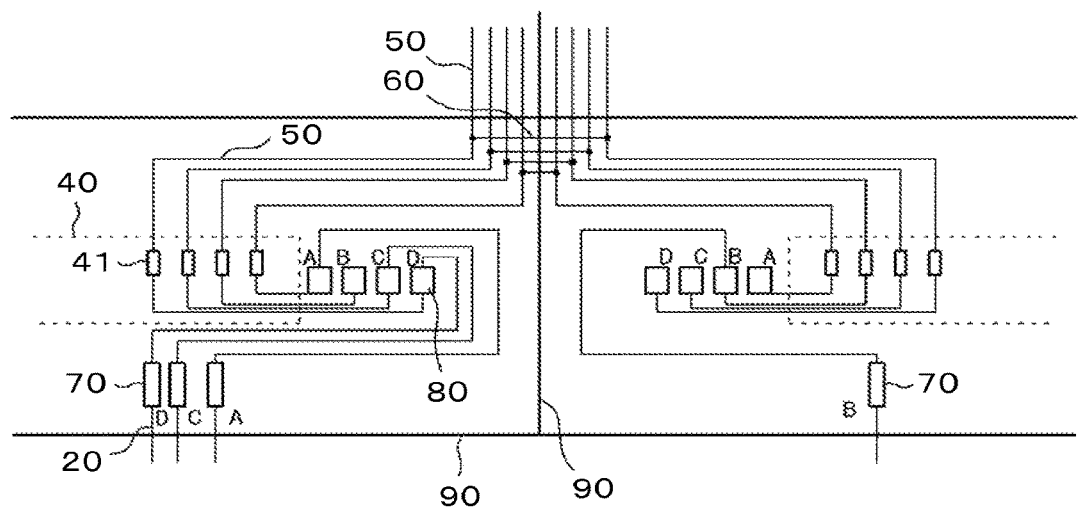
FIG. 5 is a plan view showing a second embodiment of the invention.

FIG. 5 illustrates examples of the signal lines 50, connecting wires 60, flexible wiring substrate terminals 70, and static electricity countermeasure wires 20 making up the second embodiment. Also in FIG. 5, four wires from the gate circuit, not shown, in each liquid crystal cell are extended to the IC driver terminals 41 in the IC driver mounting area 40. The second embodiment is different from the first embodiment in FIG. 4 in that there are three flexible wiring substrate terminals 70 in the left-hand liquid crystal cell while there is one flexible wiring substrate terminal 70 in the right-hand liquid crystal cell.

In FIG. 5, the wires leading up to the inspection terminals 80 are the same as those in the first embodiment of FIG. 4. The difference is that the wires from the inspection terminals 80 up to the flexible wiring substrate terminals 70 are made different between the left-hand and the right-hand liquid crystal cells. This entails there being different numbers of flexible wiring substrate terminals 70 between the left-hand and the right-hand liquid crystal cells. In the right-hand liquid crystal cell, the terminals on the right-hand edge are the same as in the left-hand liquid crystal cell in FIG. 5. Conversely, in the left-hand liquid crystal cell, the terminals on the left-hand edge are the same as in the right-hand liquid crystal cell. Thus the total number of terminals is the same between the left-hand and the right-hand terminals.

That is, the structure in FIG. 5 is characterized in that the flexible wiring substrate terminals 70 are arranged lopsidedly on the right in each liquid crystal cell. It also follows that the flexible wiring substrate connected to each liquid crystal cell is positioned lopsidedly on the right relative to the liquid crystal cell. The second embodiment is effective where, depending on the structure of the product in which the liquid crystal cells are housed, the flexible wiring substrate should preferably be connected off-center of each liquid crystal cell.

Third Embodiment

Figure 6:
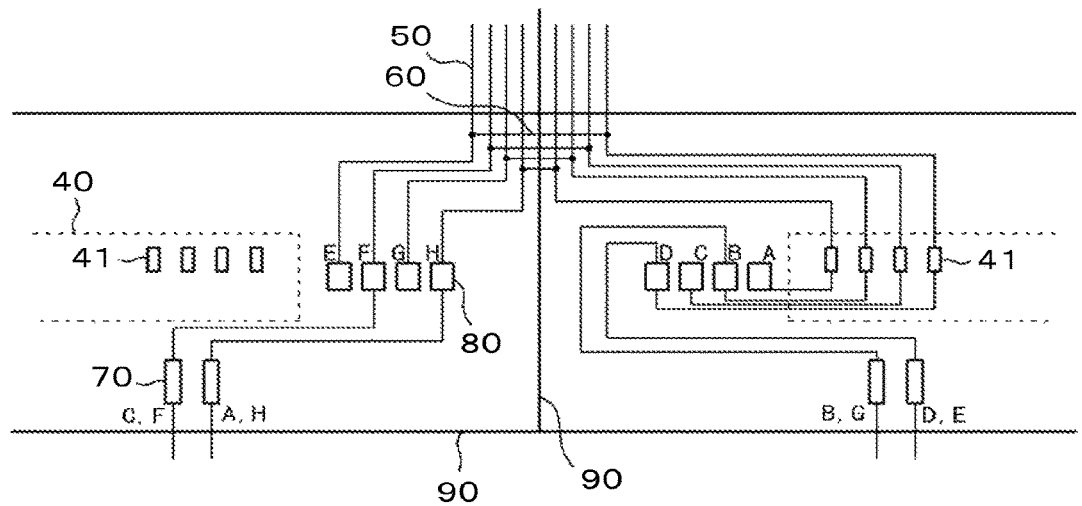
FIG. 6 is a plan view showing a third embodiment of the invention.
Figure 7:
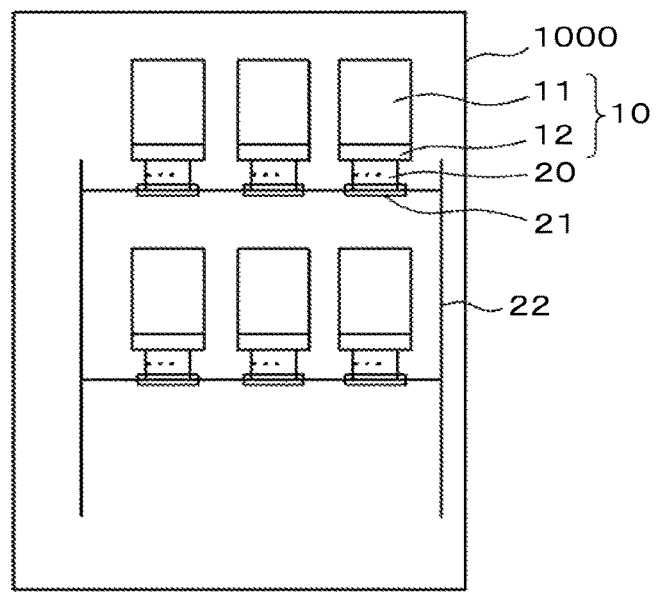
FIG. 7 is a plan view showing a typical ordinary mother TFT substrate.
Figure 8:
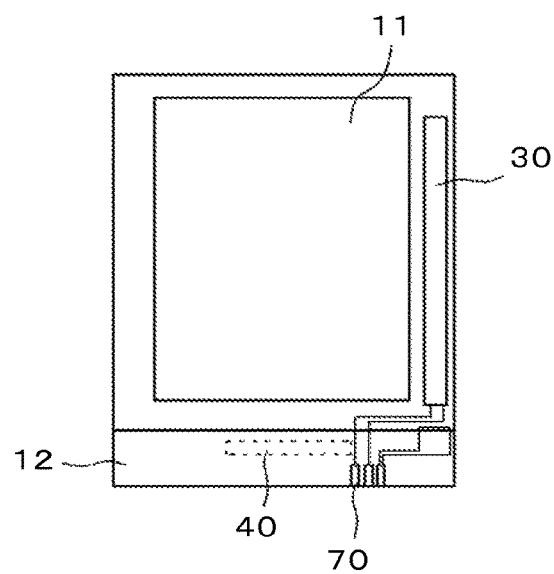
FIG. 8 is a plan view of a liquid crystal cell indicated in FIG. 7.
Figure 9:
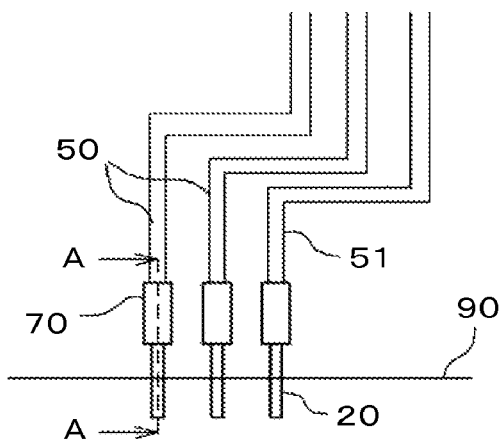
FIG. 9 is a plan view showing examples of ordinary flexible wiring substrate terminals and ordinary static electricity countermeasure wires.
Figure 10:
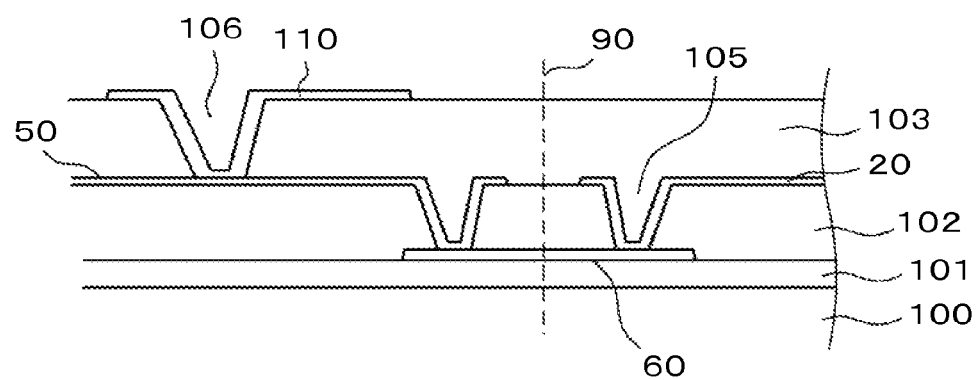
FIG. 10 is a cross-sectional view taken along line A-A in FIG. 9.

FIG. 6 illustrates examples of the signal lines 50, connecting wires 60, flexible wiring substrate terminals 70, and static electricity countermeasure wires 20 making up the third embodiment. Also in FIG. 6, four wires from the gate circuit, not shown, in each liquid crystal cell are extended to the IC driver terminals 41 in the IC driver mounting area 40. The difference between the third embodiment and the first embodiment in FIG. 4 is that the signal lines 50 in the left-hand liquid crystal cell are directly connected to the inspection terminals 80 without the intervention of the IC driver terminals 41 in the IC driver mounting area 40. The signal lines 50 in the right-hand liquid crystal cell are connected, as in the first embodiment of FIG. 4, to the IC driver terminals 41 in the IC driver mounting area 40 before being connected to the inspection terminals 80.

In the structure shown in FIG. 6 where the connections with the wires and terminals leading up to the flexible wiring substrate terminals 70 differ on both sides of the scribe line 90, the signal lines 50 of the adjacent liquid crystal cells may be connected via the connecting lines 60 so as to reduce the number of the flexible wiring substrate terminals 70. This makes it possible to prevent the liquid crystal cells as well as the flexible wiring substrate from growing in size, as with the first or the second embodiment.

While the above embodiments have been described in conjunction with liquid crystal display devices, the present invention can also be applied to other display devices such as organic EL display devices that have flexible wiring substrate terminals and need to be protected against static electricity.

What is claimed is:

1. A display device comprising:
 a connecting wire on a first insulating film,
 a second insulating film on the connecting wire,
 a signal line on the second insulating film,
 wherein the signal line intersects the connecting wire and extends along a scribe line,
 the connecting wire is connected to the signal line through a through hole that is formed in the second insulating film,
 the connecting wire extends to the scribe line, and
 the signal line is connected to an IC driver terminal, and is connected to flexible wiring substrate terminals through the IC driver terminal.

2. The display device according to claim 1, further comprising,
 a third insulating film on the signal line,
 wherein the signal line and the through hole are covered by the third insulating film.

3. The display device according to claim 1, further comprising,
 an inspection terminal arranged between the IC driver terminal and the flexible wiring substrate terminals in a plan view,
 wherein the signal line is connected to the flexible wiring substrate terminals through the IC driver terminals and the inspection terminal.

4. A display device comprising:
 a first substrate having a terminal area, a first scribe line adjacent to the terminal area, a second scribe line connected to the first scribe line and intersecting with the first scribe line, and a signal line extend along the second scribe line; and
 the terminal area having a first terminal adjacent to the first scribe line, a second terminal formed in the terminal area and arranged apart from the first terminal, a third terminal formed in the terminal area and arranged apart from the first terminal and the second terminal, a first wire connected to the first terminal and extends along the second scribe line, and a second wire connected to the signal line and extends along the first scribe line,
 wherein the first wire extends to the first scribe line from the first terminal, and the second wire extends to the second scribe line from the signal line,
 the signal line is connected to the second terminal,
 the signal line is connected to the third terminal through the second terminal, and
 the signal line is connected to the first terminal through the second terminal and the third terminal.

5. The display device according to claim 4,
 wherein the first wire and the second wire are formed in a different layer from the signal line.

6. The display device according to claim 4,
 wherein the second wire is connected to the signal line through a through hole.

7. A display device comprising:
 a first scribe line,
 a second scribe line intersecting with the first scribe line,
 a signal line that extends along the second scribe line and is connected to a first terminal,
 a first wire that extends along the second scribe line and connected to a second terminal, and
 a second wire that extends along the first scribe line and is connected to the signal line,
 wherein the first terminal and the second terminal are arranged apart from each other, and connected by a third wire,
 the signal line is connected to the first wire through the first terminal, the third wire and the second terminal, and
 the second wire extends to the second scribe line from the signal line, and the first wire extends to the first scribe line from the second terminal.

8. The display device according to claim 7,
 wherein the first wire and the second wire are formed in a different layer from the signal line.

9. The display device according to claim 7,
 wherein the second wire is connected to the signal line through a through hole.

* * * * *